United States Patent [19]

Wojciechowski

[11] Patent Number: 4,666,358
[45] Date of Patent: May 19, 1987

[54] APPARATUS FOR HANDLING PARTS

[76] Inventor: Felix Wojciechowski, 154 Broadway, Rockford, Ill. 61108

[21] Appl. No.: 696,694

[22] Filed: Jan. 31, 1985

[51] Int. Cl.⁴ ............................................. B65H 1/00
[52] U.S. Cl. .............................. 414/223; 51/215 HM; 51/237 T; 198/377; 198/476.1; 414/224; 414/758
[58] Field of Search ............. 414/222, 224, 225, 729, 414/744 A, 748, 758, 759, 770, 773; 269/13, 14; 198/463.6, 474.1, 377, 476.1, 477.1; 51/215 UE, 215 HM, 215 M, 108 R, 134, 237 T

[56] References Cited

U.S. PATENT DOCUMENTS

| | | | |
|---|---|---|---|
| 1,263,485 | 4/1918 | Thornburg | 198/476.1 |
| 3,122,234 | 2/1964 | Kagley | 198/477.1 |
| 3,490,575 | 1/1970 | Herrmann | 198/377 |
| 4,143,776 | 3/1979 | Meyers et al. | 414/735 |
| 4,270,649 | 6/1981 | Mayer | 198/341 |
| 4,492,512 | 1/1985 | Mink | 414/744 A |

OTHER PUBLICATIONS

Excerpt from Mattison Magazine, "Your News" (Fall 1983).

Primary Examiner—Robert J. Spar
Assistant Examiner—Donald W. Underwood
Attorney, Agent, or Firm—Willian Brinks Olds Hofer Gilson & Lione Ltd.

[57] ABSTRACT

An apparatus for handling parts having a table disposed in a generally horizontal plane, a plurality of first and second part carriers spaced angularly around the upper side of said table, and means for continuously rotating said table about its upright axis. Parts are automatically loaded onto the first part carriers as the table rotates. Subsequently, transfer mechanisms associated with each pair of first and second part carriers cooperate with transfer cams mounted adjacent the table to turnover and transfer parts from the first part carriers to the second part carriers. Parts are then automatically unloaded from the second part carriers as the table rotates.

19 Claims, 16 Drawing Figures

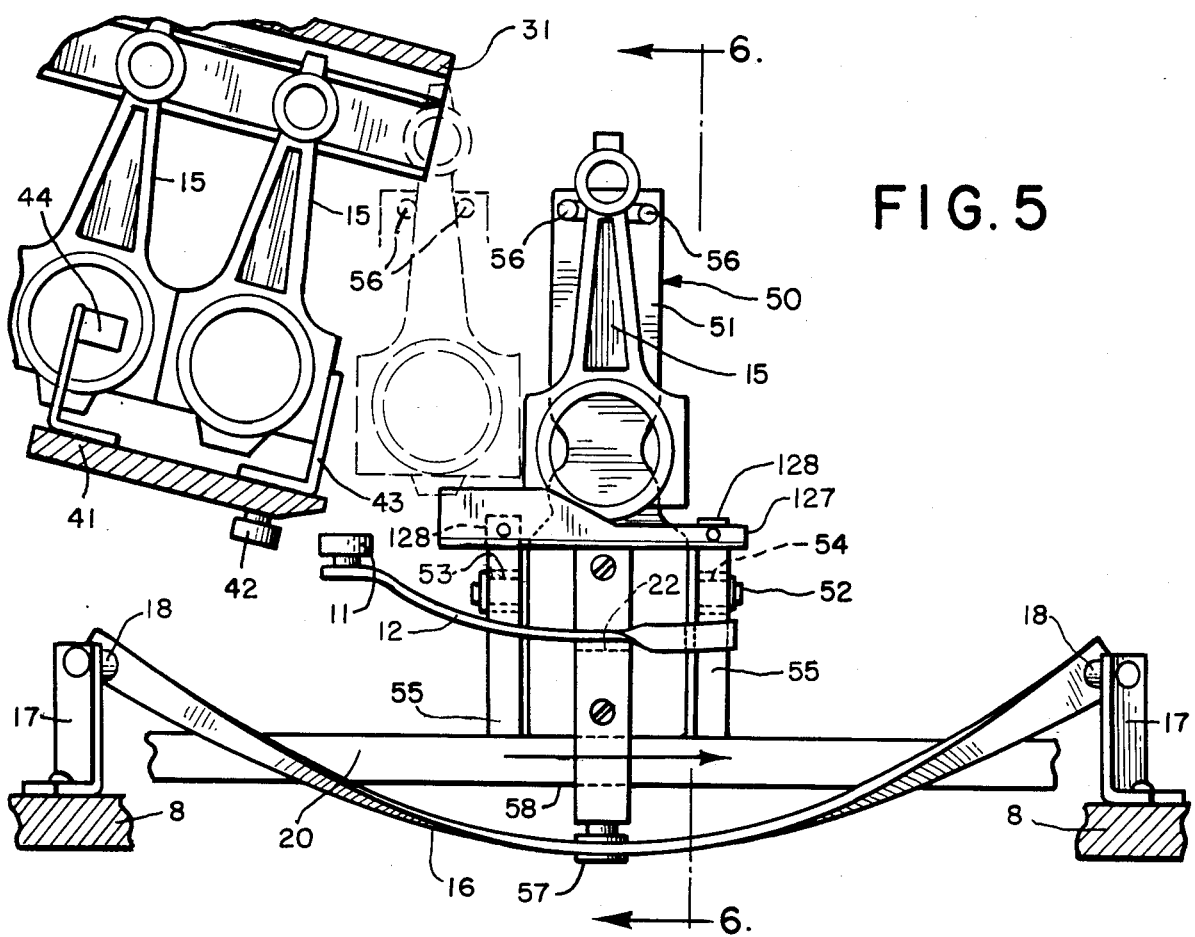
FIG. 5
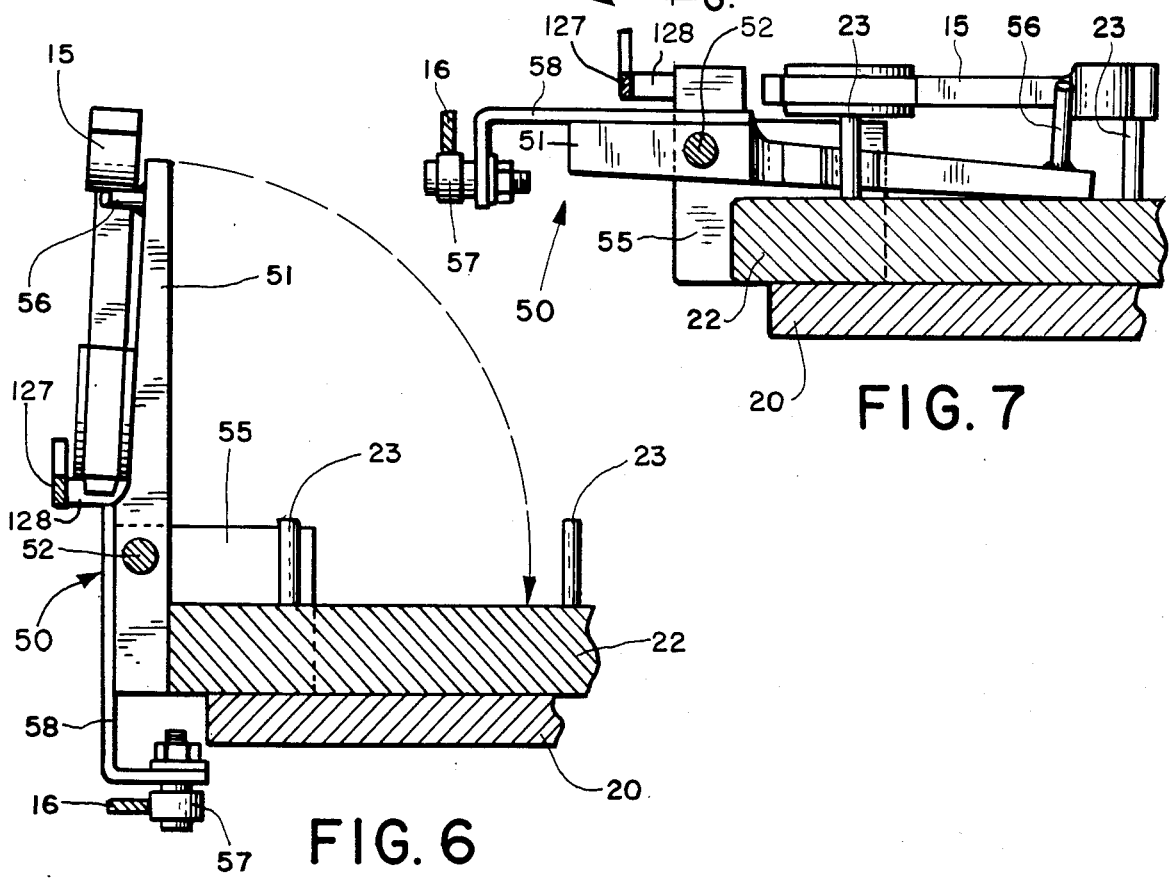
FIG. 6
FIG. 7

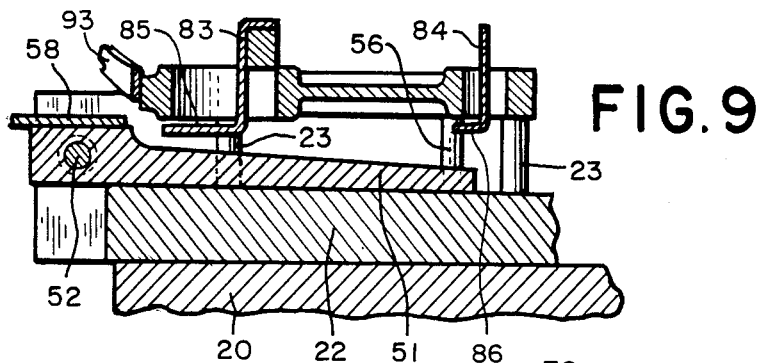
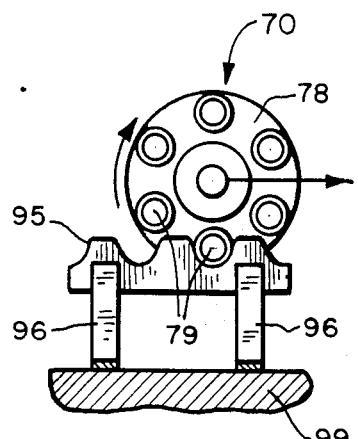
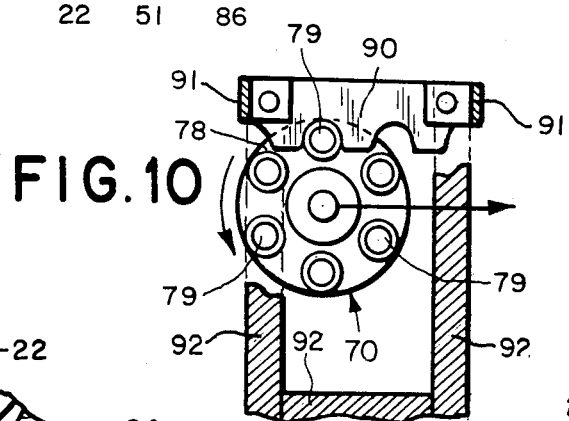
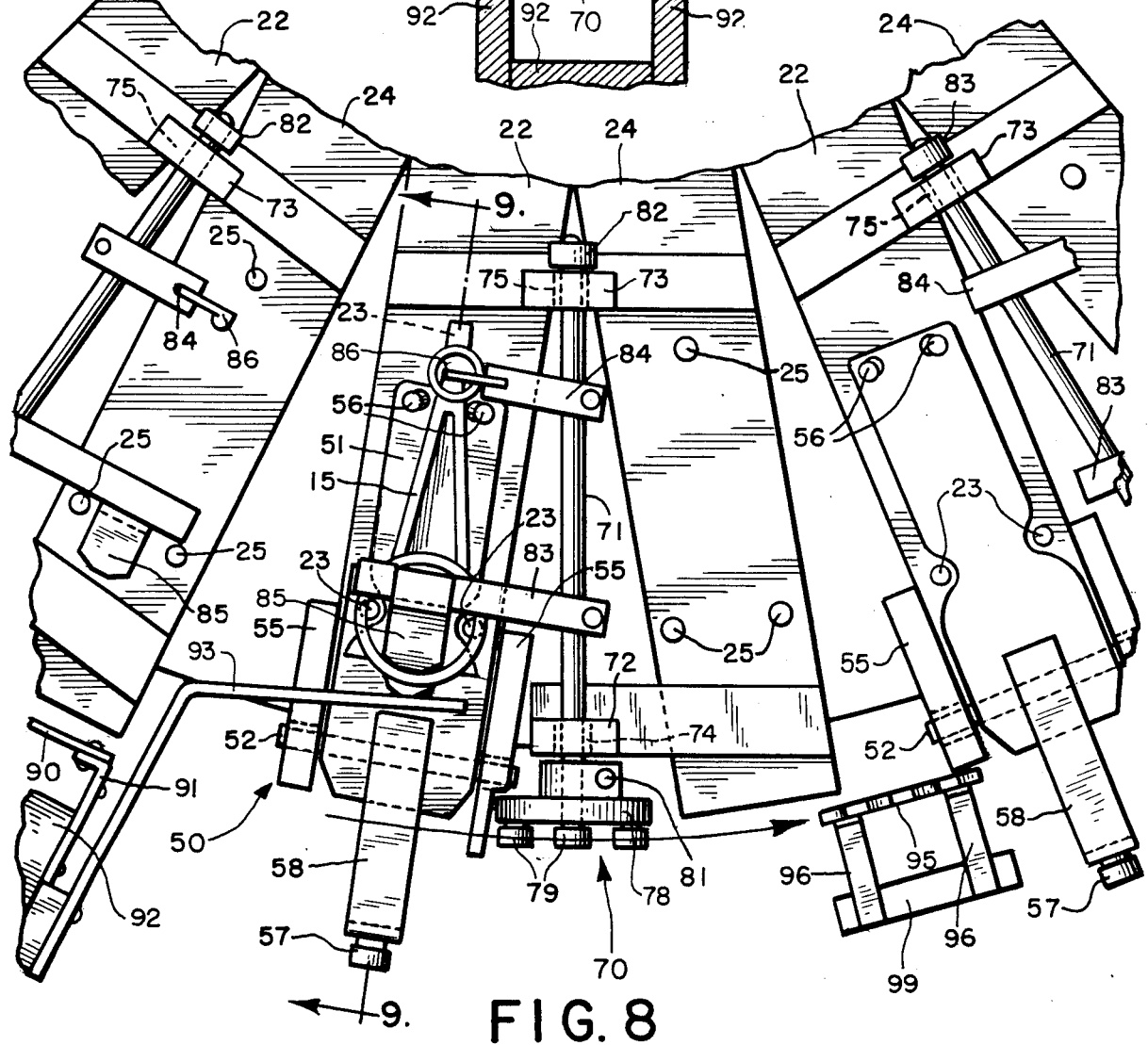
FIG. 9
FIG. 11
FIG. 10
FIG. 8

APPARATUS FOR HANDLING PARTS

BACKGROUND OF THE INVENTION

This invention relates to a new and novel apparatus for handling parts. More particularly, the invention relates to an apparatus in which parts are automatically loaded onto part carriers or fixtures on a continuously rotating table and are carried around by the table while an operation such as a machining operation is being performed on the parts. Subsequently, each part, in accordance with the present invention, is turned over and transferred to another part carrier or fixture on the table as the table rotates and is again carried around by the table so that the operation can be performed on the other side of the part. After the machining operation is performed on both sides of the part, the part is automatically unloaded from the part carrier or fixture as the table rotates.

Machine tools which finish two parallel or opposed sides of a part are often used in conjunction with slowly and continuously rotating tables. As the table rotates, it carries part carriers or fixtures, each loaded with a part to be operated upon, under and away from a machine tool such as a surface grinding machine. The grinding or milling heads of the surface grinding machine operate upon the parts and roughen and/or finish grind the upper and lower sides of each part as the parts are carried under the surface grinding machine by means of the continuously rotating table. The surface grinding machine can operate only upon the exposed or upward facing side of each part. Therefore, it is necessary to turn each part over after the upward facing side is ground and each turned over part is then again carried under the surface grinding machine by the rotating table.

The tasks of loading, turning over and unloading are generally accomplished by means of automatic or semi-automatic devices. Though many automatic or substantially automatic parts handling devices are known in the art, it is apparent that most of them are very complex and complicated, and are quite expensive. Generally, loading and unloading of parts, as well as the turning over of parts in connection with such a machining operation is accomplished by the use of complex and complicated external apparatus. Very often, such external apparatus is a separate machine or robot.

The present invention overcomes the deficiencies of the prior art by eliminating the need for such external or separate machines or robots to accomplish the tasks of loading, turning over and unloading. The present invention provides each of the part carriers or fixtures adapted to be loaded with a part with new and unique mechanisms that are totally passive and do not require the use of a complex separate machine. In other words, the mechanisms of the present invention are put into motion as the table rotates so that in effect, the part fixtures of the present invention become self-loading and self-unloading. In addition, the turning over of parts is automatically accomplished as the table rotates without the use of a separate machine or robot.

It is thus a primary object of this invention to provide an improved device which substantially automatically loads parts onto and unloads parts from the part carriers of a rotating table and which substantially automatically turns over such parts so that a machining operation may be performed on both sides of the parts.

It is another object of the present invention to provide an improved device which is capable of loading parts into and/or unloading parts from the fixtures of the table while the table is rotating with continuous motion, and which turns over such parts while the table is so rotating.

A further object of the present invention is to provide an improved device for handling parts which does not require the provision of complex and separate external apparatus in order to accomplish the loading and unloading steps, as well as the turnover of the parts so that both sides of each part may be ground.

Yet another object of the present invention is to provide an improved device for handling parts which is less costly to manufacture and assemble, and which is simpler and less expensive to operate.

SUMMARY OF THE INVENTION

The foregoing objects, along with numerous features and advantages of the invention, are achieved in a new and novel apparatus for handling parts. The present invention eliminates the need for separate machines or robots to accomplish the loading and unloading of parts, as well as the turning over of parts so that both sides of the parts may be operated upon. In accordance with the present invention, parts are automatically loaded and unloaded from part carriers as the table rotates. In addition, parts are automatically turned over as the table rotates. The apparatus includes a table disposed in a generally horizontal plane and a plurality of first and second part carriers spaced angularly around the upper side of the table. Means for continuously rotating the table about its upright axis are provided.

To accomplish the automatic loading of parts onto the part carriers the apparatus is provided with a feed mechanism disposed above the horizontal plane of the table and a loading cam mounted adjacent to the table. The apparatus also includes a plurality of loading mechanisms, each of which is associated with a corresponding one of the first part carriers. Each of the loading mechanisms is adapted to cooperate with the loading cam and pick up a part from the feed mechanism and load the part onto the associated first part carrier as the table rotates.

To accomplish the task of automatically turning parts over as the table rotates, a transfer cam is provided which is mounted adjacent to the table. The apparatus further includes a plurality of transfer mechanisms, each of which is associated with a corresponding one of said first and second part carriers. Each of the transfer mechanisms is adapted to cooperate with the transfer cam and transfer a part from the associated first part carrier to the associated second part carrier as the table rotates.

To accomplish the automatic unloading of parts from the table the apparatus is provided with an ejector arm disposed above the horizontal plane of the table and an unloading cam which is mounted adjacent to the table. A plurality of transfer mechanisms, which are also used to accomplish the task of automatically turning parts over, are also provided. Each transfer mechanism is adapted to cooperate with the unloading cam to raise a part off of the associated second part carrier into a generally vertical position to be picked up by the ejector arm as the table rotates.

BRIEF DESCRIPTION OF THE DRAWINGS

The invention summarized above can be best understood by reading the following detailed description in conjunction with the accompanying drawings in which:

FIG. 5 is a side view showing the self-loading tray of a part fixture picking up a part from the infeed guide of the feed mechanism in accordance with the present invention.

FIG. 6 is a cross-section view taken substantially along the line 6—6 of FIG. 5 and shows the loading tray in a vertical position picking up a part.

FIG. 7 is a cross-section view similar to FIG. 6 but shows the loading tray in a horizontal position with a part dropped onto the rest posts of a part fixture in accordance with the present invention.

FIG. 8 shows the turnover and transfer mechanism of the present invention for turning over the part and transferring the part from one part carrier to an adjacent associated part carrier.

FIG. 9 shows a cross-section view taken substantially along the line 9—9 of FIG. 8.

FIG. 10 is a side view showing the first transfer cam of the turnover and transfer area of the present invention.

FIG. 11 is a side view showing the second transfer cam of the turnover and transfer area of the present invention.

DETAILED DESCRIPTION OF THE PREFERRED EMBODIMENT

Figure 1:
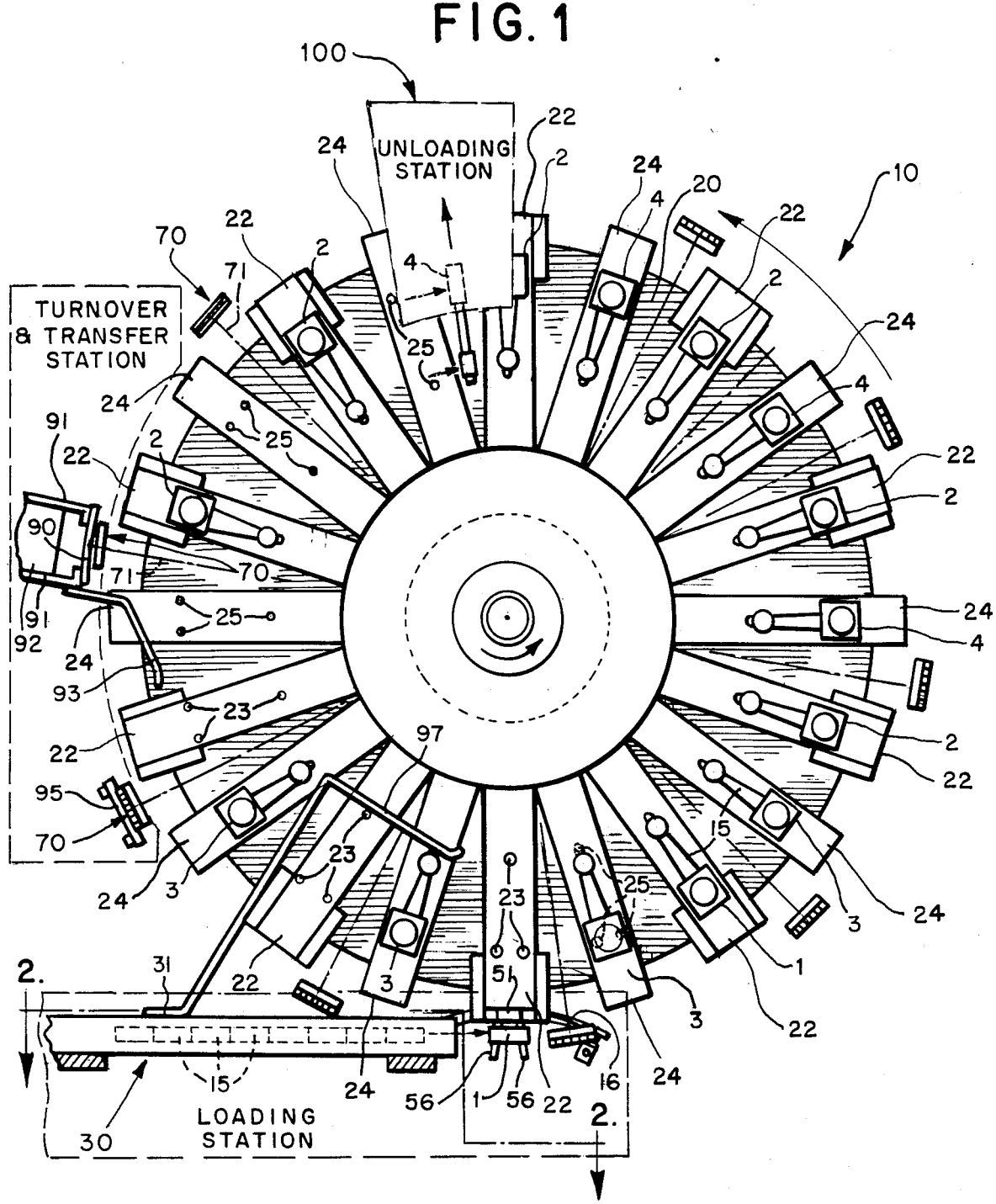
FIG. 1 is a top plan view of an exemplary embodiment of the invention in simplified schematic form.

Referring now to the drawings, and specifically to FIG. 1, an exemplary embodiment of a new and novel apparatus for handling and transferring parts, constructed in accordance with the present invention, is designated generally by the reference numeral 10. The device 10 is adapted to handle parts, such as parts 15. For purposes of this exemplary embodiment, these parts are identified as being the connecting rods of the type used in internal combustion engines. The invention, however, should not be so limited, as it may be used with parts of a variety of forms and shapes. Accordingly, the invention should be accorded a scope commensurate with the appended claims. The apparatus for handling parts 15 is associated with a surface grinding machine (not shown) which serves to rough and/or finish grind the upper and lower sides of each part.

The apparatus for handling parts 15 includes a horizontal table 20 (FIG. 1) which is adapted to be rotated continuously and in a counterclockwise direction about an upright axis. The table 20 carries parts beneath the grinding wheels (not shown) of the grinding machine. To accurately support the parts 15 during the grinding operation, the rotary table 20 includes a series of part carriers or fixtures 22 and 24 which are spaced angularly around the upper side of the table 20, the fixtures 22 alternating with the fixtures 24 around the table 20. Each fixture 22, 24 is of conventional construction and includes a clamping or retaining device to clamp the part after the part has been loaded onto the fixture and to unclamp the part just before the part is unloaded. As methods of clamping and retaining parts in the fixture are standard practice and are commonly known and used by those of ordinary skill in the art, the description of such methods is omitted from this description.

Each of the fixtures 22 includes three rest posts 23. The three rest posts 23 are spaced apart in a triangular configuration and are adapted to support a part 15 when such a part is loaded on to the fixture 22. Fixtures 24 include a similar triangular arrangement of three rest posts 25 adapted to support a part 15 which is placed on fixture 24 after it is removed from fixture 22 and turned over (upside down) and reloaded onto the fixtures 24. In this exemplary embodiment, rest posts 25 of fixtures 24 differ slightly from rest posts 23 of fixtures 22 in that they are slightly higher so that, when a part 15 is turned over and transferred from fixture 22 onto fixture 24, the required amount of stock will be taken off from the other side of the part 15.

In the operation of the present invention, raw parts 15 (i.e., parts with neither side ground and indicated in the drawings by the reference numeral 1) are delivered at a loading station to each of the fixtures 22 by a feeding mechanism 30 (FIG. 1) whose construction and operation will be described in greater detail hereinafter. As the table 20 rotates, the raw parts 15 are carried beneath the grinding wheels and are ground on their first or upper side. Those raw parts whose upper sides have been ground and are facing upwardly are indicated throughout the drawings by the reference numeral 2. The parts 2, having their upper sides ground, then enter a turnover and transfer area where the part 2 is removed from its fixture 22 and is turned over while it is substantially simultaneously transferred into one of the fixtures 24. Parts having one ground side and which have been turned over so that their unground side is facing upwardly are designated throughout the drawings by the reference numeral 3. The turnover and transfer operation is accomplished by means of a turnover and transfer mechanism 70 for automatically transferring parts 15 from the fixtures 22 into the fixtures 24 while substantially simultaneously turning the part over so that the unground side of the part faces upwardly while it rests on rest posts 25 of the fixture 24. After the part 3 which has one ground side and which has been turned over so that its unground side is facing upwardly has been placed into the fixture 24 at the turnover and transfer area, the part 3 is rotated idly past the feed mechanism 30 and again is carried beneath the grinding wheel so that the second side of the part may be ground. Parts having two ground sides, indicated throughout the drawings by the reference numeral 4, are then removed from fixtures 24 at an unloading station and automatically transferred to a discharge conveyor by means of an unloading mechanism 100 after they have passed from beneath the grinding wheels.

Figure 2:
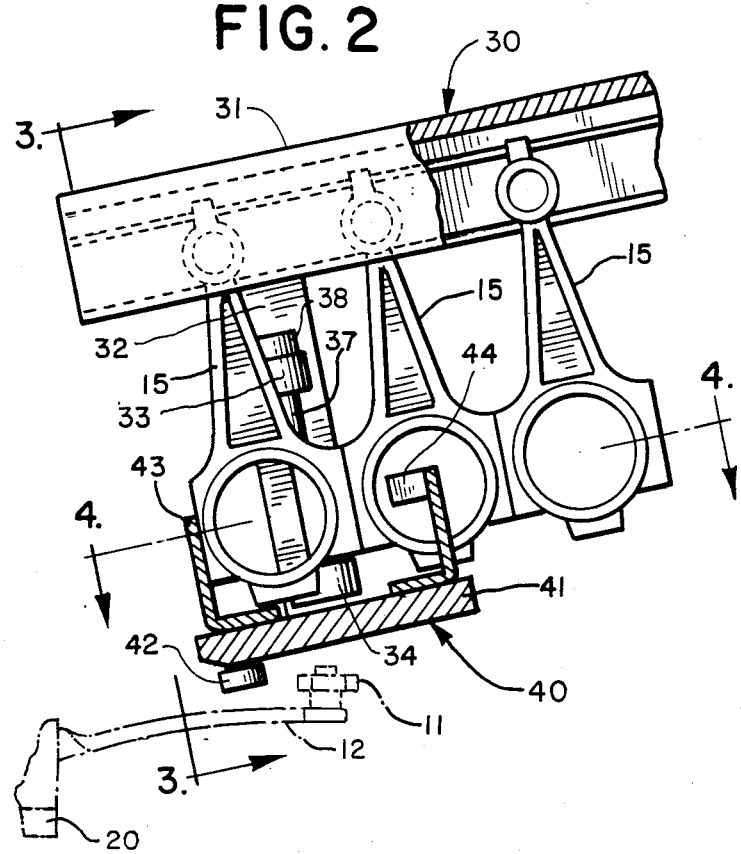
FIG. 2 is a cross-section view of the loading station taken substantially along the line 2—2 of FIG. 1.

As best shown in FIG. 2, raw parts 15 to be operated upon by the device 10 of the present invention are conveyed to the table 20 at the loading station by means of a feed mechanism 30 which includes an infeed guide 31 which is disposed above the horizontal plane of the rotary table 20. Infeed guide 31 slopes downward at an angle which is only slightly more of an incline than is needed so that raw parts 15 may slide down infeed guide 31 and overcome friction. In the exemplary embodiment, the angle of incline of infeed guide 31 is about 20 degrees. The slight incline of infeed guide 31 allows raw parts 15 to be fed to the table 20 by sliding down infeed guide 31 restrained only by means of an escapement mechanism 40 which is more fully described hereinafter. It should be appreciated that no active or powered mechanism is needed to so feed the parts as the loading operation is effected by the cooperation of the table 20 of the device 10 with escapement mechanism 40 and by gravity.

Figure 3:
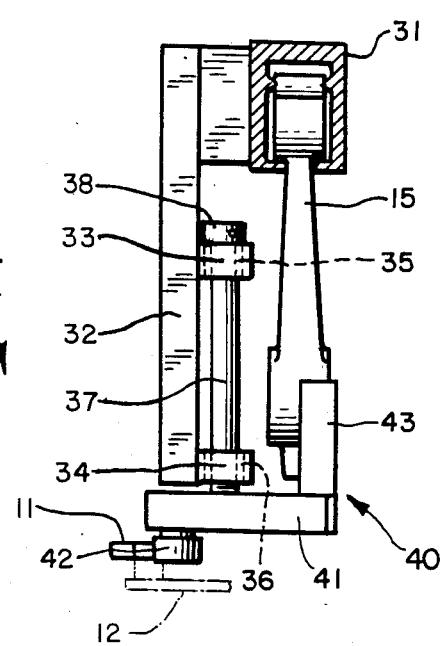
FIG. 3 is a side view showing the escapement mechanism of the loading station taken substantially along the line 3—3 of FIG. 2.
Figure 4:
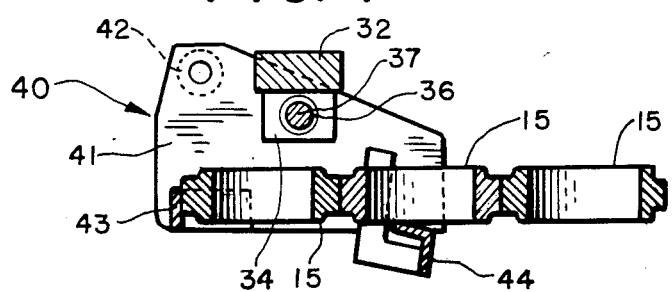
FIG. 4 is a cross-section view taken substantially along the line 4—4 of FIG. 2 and shows the escapement mechanism in its closed position.

Turning now to FIGS. 3 and 4 the escapement mechanism 40 is more fully described. The escapement mechanism 40 is secured to the infeed guide 31 by means of a bracket 32 which is attached to the escapement mechanism 40 and rigidly secures the same to the infeed guide 31. An upper bearing block 33 and a lower bearing block 34 are each mounted to the bracket 32. Bearing blocks 33, 34 are each provided with sintered bronze shoulder bushings 35 and 36, respectively, which serve to rotatably retain a pivot shaft 37. Pivot shaft 37 is rigidly joined at its upper end to shaft collar 38 which retains the assembly on its pivot bearings. Pivot shaft 37 is rigidly joined at its lower end to a swing plate 41. Cam follower 42 is mounted to the bottom of swing plate 41. Swing plate 41 is rotatable through a small angle about pivot shaft 37. In operation, swing plate 41 is rotated when an escapement cam 11, which is attached to each fixture 22 by means of a bracket 12, acts on cam follower 42 mounted on the bottom of swing plate 41. As table 20 rotates, a fixture 22 passes by escapement mechanism 40 and infeed guide 31, so that escapement cam 11 acts upon cam follower 42 to move the swing plate 41 through a small angle.

Figure 4A:
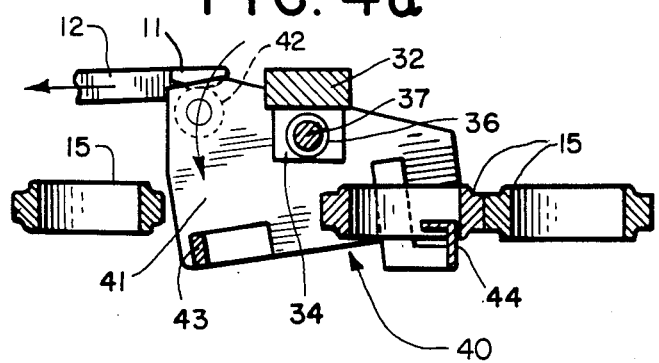
FIG. 4a is a cross-section view similar to FIG. 4 but shows the escapement mechanism in an open position releasing a part.

As best shown in FIGS. 2 and 4, a front escapement stop 43 and a back escapement stop 44 are rigidly attached to swing plate 41. In operation, as rotary table 20 rotates so that one of the fixtures 22 passes through the loading area, the escapement cam 11 attached to the fixture 22 by means of bracket 12 moves the swing plate 41. The movement of the swing plate 41 permits the leading part 15 which is in front and at the bottom of infeed guide 31 to pass freely—the front escapement stop 43 being moved out of its path—while the remaining parts 15 in the guide channel 31 are momentarily restrained from sliding forward and downward by back escapement stop 44. See FIG. 4a. The swing plate 41 is shaped so that gravitational force causes a restoring moment about the pivot which brings the escapement mechanism 40 to its closed position when no parts are present in the infeed guide 31. The onrushing parts 15 substantially help close the gate immediately after each release of a single part 15.

Turning now to FIGS. 5 through 7, the loading mechanism 50, which is automatically self-loading, is described. Each of the fixtures 22 is equipped with a loading tray 51 which is rigidly attached to a pivot shaft 52 rotatable in a pair of sintered bronze shoulder bushings 53, 54. The bushings 53, 54 are installed in bearing block 55 which is in turn fastened to the outer end of fixture 22. Each loading tray 51 is provided with two slightly diverging pick-up fingers 56 which are rigidly attached to the tray 51 at its free end. Each loading tray 51 is also provided with a cam follower 57 which is mounted on each tray 51 by means of a bracket 58. Cam follower 57 is adapted to cooperate with a loading cam 16, which is provided adjacent to the rotating table 20 in the loading area. The loading cam 16 is mounted on brackets 17, through spacers 18, to a stationary support 8 located adjacent rotary table 20. See FIG. 5. Loading cam 16 traces a double helical curve which curves inward and downward and then upward and outward.

As table 20 rotates and moves a fixture 22 through the loading area, the cam follower 57 associated with the loading tray 51 of fixture 22 is engaged by the essentially helical curve of loading cam 16 such that loading tray 51 is gradually raised from a horizontal to a vertical position. As loading tray 51 is raised into its vertical position, the pick-up fingers 56 engage the neck of part 15, gradually gaining control of it, as the space between them narrows. See FIGS. 5 and 6. Substantially simultaneously, as a result of the action of escapement cam 11 of fixture 22 acting upon cam follower 42, the part 15 is released from the infeed guide 31 and automatically loaded onto the loading tray 51. The return portion of loading cam 16 allows the loading tray 51 to return to a horizontal position on fixture 22 so that loading tray 51 drops the piece part 15 onto rest posts 23 of fixture 22. As best shown in FIG. 7, the motion of the loading tray 51 continues downward until it comes to rest so that the pick-up fingers 56 drop below the level of the finished surface of the parts 15 to be machined.

Referring now to FIGS. 8 through 11, the parts turnover and transfer mechanism of the present invention is more fully described. A turnover and transfer mechanism 70 is associated with each pair of fixtures 22 and 24. Each turnover and transfer mechanism 70 includes a pivot shaft 71 which is rotatably supported by a front bearing 72 and a rear bearing 73 with sintered bronze shoulder bushings 74, 75, respectively, providing the sliding surfaces. As best shown in FIG. 8, the pivot shaft 71 is rotatably mounted on the line bisecting the angle formed by the centerlines of fixture bodies 22 and 24. A turnover wheel 78 is firmly attached to the outer end of pivot shaft 71 by means of a clamp hub 81. Turnover wheel 78 is equipped with six equally spaced cam followers 79. Shaft collar 82 retains the pivot shaft assembly on the shoulders of bushings 74, 75.

A front turnover arm 83 and a rear turnover arm 84 are rigidly clamped to pivot shaft 71. As best shown in FIG. 8, turnover fingers 85 and 86 are attached, respectively, to front turnover arm 83 and rear turnover arm 84. The fingers 85 and 86 are "L" shaped and are sized so as to be able to fit into the holes of the part 15 to be machined. See FIG. 9. The "L" shape allows the part 15 to be moved in a manner more fully described below wherein the part is slid on to the lower tip of the fingers in order to be picked up.

In this exemplary embodiment, the turnover and transfer station is located between the unloading station and the loading station such that the table rotates through the unloading area, then the turnover and transfer area and then the loading area. See FIG. 1. The turnover and transfer area includes a first transfer cam 90 and a second transfer cam 95. First transfer cam 90 is attached by means of brackets 91 to a stationary support 92 located adjacent rotary table 20. See FIG. 10. Transfer cam 90 has a roller chain rack tooth profile facing downward and is adapted to cooperate with cam followers 79 of turnover wheel 78. As a pair of fixtures 22 and 24 enter the turnover and transfer area the front and rear turnover arms 83, 84 of the associated transfer mechanism 70 are positioned at rest over the fixture 24 while the part whose upper side has been ground and is facing upwardly indicated by reference numeral 2 is positioned on the fixture 22. When a turnover wheel 78 associated with a pair of fixtures 22 and 24 and in particular cam followers 79 travel under transfer cam 90 as table 20 rotates, transfer wheel 78 and pivot shaft 71 are rotated 180 degrees (one-half revolution) thereby moving the transfer arms 83, 84 and transfer fingers 85 and 86 from fixtures 24 to fixtures 22. The fingers 85 and 86 enter the two holes of the part 15 and reach slightly below the lower surface of part 15. As best shown in FIGS. 8 and 9, a stationary plow 93 mounted to stationary support 92 is positioned to push the part 15 slightly inward as table 20 rotates and moves part 15 into engagement with plow 93, so that the tips of fingers 85 and 86 engage the lower surface of part 15 during the turnover and transfer stroke of the mechanism.

The second transfer cam 95 which differs from the first transfer cam 90 in that it is oriented upside down with respect to the first transfer cam, has a roller chain rack tooth profile mounted upward on two stationary brackets 96. Second transfer cam 95 is attached by means of the brackets 96 to a stationary support 99 located adjacent rotary table 20. Second transfer cam 95 cooperates with the transfer wheel 78 to rotate the transfer wheel 78 and pivot shaft 71 another 180 degrees (one-half revolution) so that turnover arms 83 and 84 and turnover fingers 85 and 86 pick up the part 15 and transfer it onto the three rest posts 25 of fixture 24. See FIG. 11. Accordingly, part 15 is transferred along an arcuate path between fixtures 22 and 24 so that as it is transferred between the two fixtures it is also substantially simultaneously turned over. As the part is turned over it is held in position between the tips of fingers 85, 86 and the arms 83, 84. A stationary plow 97 (see FIG. 1), attached to the infeed guide 31, pushes the part 15 slightly outwards as table 20 rotates and moves part 15 into engagement with plow 97 thereby allowing the fingers 85 and 86 to drop below the surface to be machined.

Figure 13:
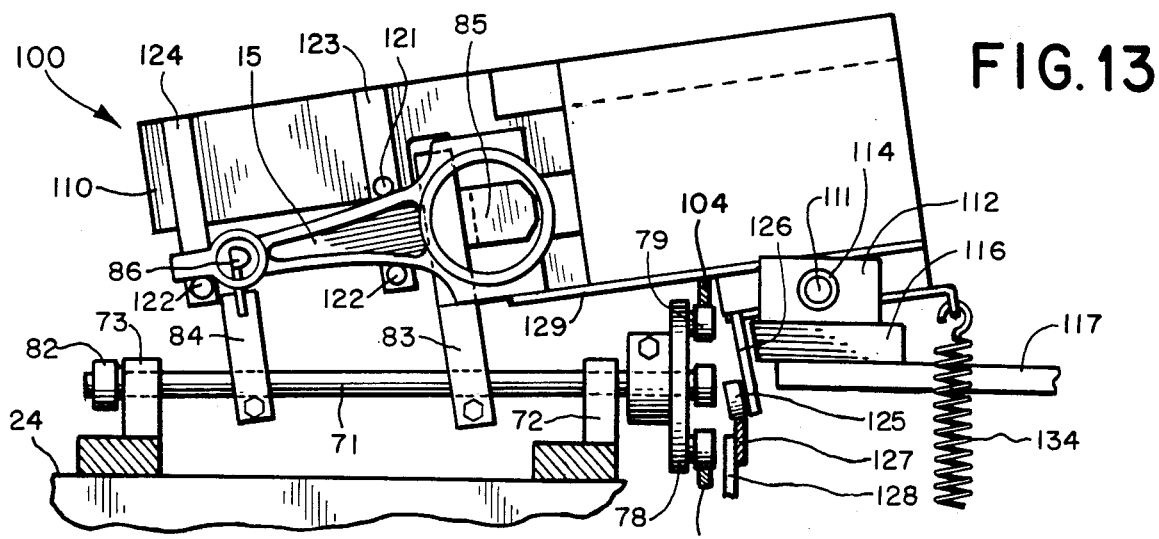
FIG. 13 is a cross-section view taken substantially along the line 13—13 of FIG. 12.
Figure 14A:
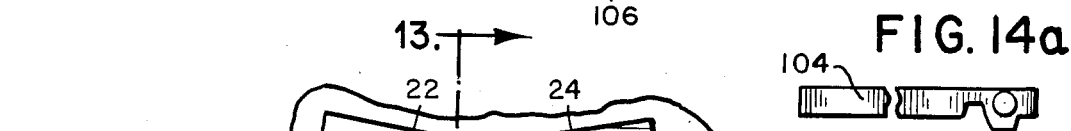
FIG. 14a is a fragmentary cross-section view taken substantially along the line 14—14 of FIG. 12 and shows the first unloading cam of the unloading mechanism of the present invention.
Figure 14B:
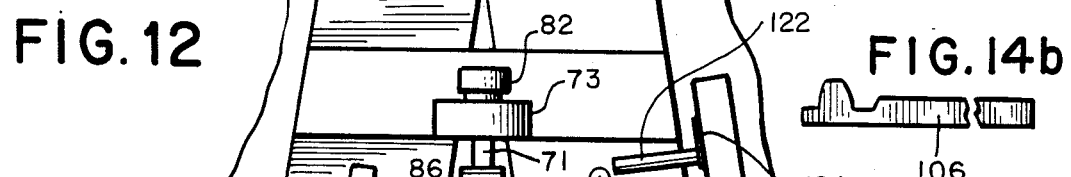
FIG. 14b is a fragmentary cross-section view taken substantially along the line 14—14 of FIG. 12 and shows the second unloading cam of the unloading mechanism of the present invention.
Figure 12:
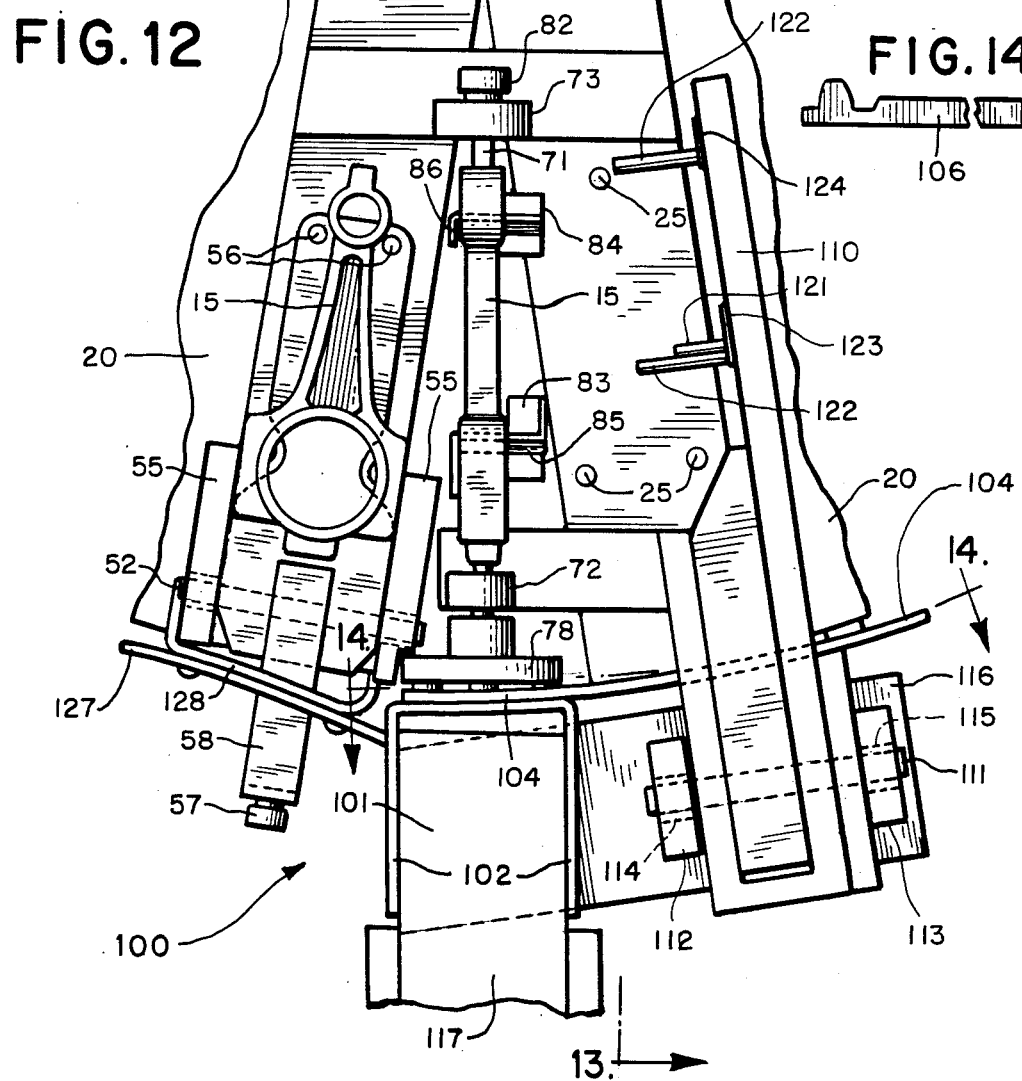
FIG. 12 is a fragmentary top view of the unloading mechanism of the unloading station of the present invention.

Referring now to FIGS. 12 through 14, the self-unloading mechanism of the present invention is described. The self-unloading mechanism 100 includes a first unloading cam 104 which is mounted to a stationary support 101 by means of two brackets 102. First unloading cam 104 interacts with cam followers 79 of turnover wheel 78 and rotates turnover wheel 78 along with pivot shaft 71 90 degrees (one-quarter revolution) so that part 15 is lifted 90 degrees from rest posts 25 of fixture 24. After part 15 is raised 90 degrees into a vertical position, first unloading cam 104 cooperates together with a second unloading cam 106 to hold turnover wheel 78 in a fixed position and hence thereby hold part 15 in its raised vertical position of 90 degrees as table 20 continues to rotate. Self-unloading mechanism 100 also includes an ejector arm 110 disposed above the horizontal plane of the rotating table 20. Ejector arm 110 has a pivot shaft 111 which is retained in two bearing blocks 112 and 113 with sintered bronze shoulder bushings 114 and 115, respectively, providing the sliding surfaces. The bearing blocks 112, 113 are mounted on a pad 116 extending from a stationary support 117. As the raised part 15 travels toward the ejector arm 110 it is engaged by picker rods 121 and 122 which extend horizontally outwards on the arms of strips 123 and 124.

The strips 123 and 124 serve to stop the part 15 from moving while table 20 continues to rotate while also allowing the raised arms 83 and 84 to pass freely by ejector arm 110 as table 20 continues to rotate. The ejector arm 110 carries a cam follower 125 by means of a mounting bracket 126. Cam follower 125 is adapted to cooperate with a lift cam 127 which is attached by means of bracket 128 to each fixture 22. Lift cam 127 operates to pivot the ejector arm 110 by acting upon cam follower 125 thereby causing the part 15 to slide down a slide 129 mounted to the ejector arm 110 and onto a conveyor (not shown) to be transported for further manufacturing operations. As table 20 continues to rotate and turnover arms 83 and 84 move past the ejector arm 110, second unloading cam 106 acts on turnover wheel 78 to turn the arms 83 and 84 back by 90 degrees onto fixture 24. Optionally, first unloading cam 104 could be constructed such that it has, following its dwell portion, additional teeth to turn the turnover wheel 90 degrees toward fixture 22 to start the aforementioned turnover and transfer sequence immediately. The self-unloading mechanism 100 also includes a long extension spring 134 which is used to counterbalance the ejector arm 110 so as to reduce the operating pressure on the lift cam 127.

What has been described is a novel device for handling parts such as connecting rods of the type used in internal combustion engines. Numerous modifications or refinements of this device, or the methods associated therewith, which do not part from the scope of the invention, may become apparent to those skilled in the art. All such modifications and refinements are intended to be covered by the appended claims.

I claim:

1. An apparatus for loading parts on to a table adapted to rotate about its upright axis, said table having a plurality of first and second part carriers spaced angularly around its upper side, said apparatus comprising:

a loading cam mounted adjacent said table;
a feed mechanism disposed above the horizontal plane of said table; and,
a plurality of loading mechanisms, each associated with a corresponding one of said first part carriers, each said loading mechanism comprising a loading tray pivotally mounted to the outer end of said associated first part carrier, said loading tray including a cam follower adapted to cooperate with said loading cam and pick up a part from said feed mechanism and load said part onto said associated first part carrier as said table rotates, whereby said cam follower cooperates with said loading cam as said table rotates so that said loading tray is raised into a generally vertical position to pick up said part from said feed mechanism and then lowered with said part into a generally horizontal position on to said associated first part carrier.

2. The apparatus of claim 1 wherein said feed mechanism includes an infeed guide.

3. The apparatus of claim 2 wherein said loading cam traces a double helical curve which curves inward and downward and then upward and outward.

4. The apparatus of claim 3 further comprising an escapement mechanism connected to said feed mechanism for releasing parts one at a time to said loading trays as said table rotates.

5. An apparatus for transferring parts from a plurality of first part carriers to a plurality of second part carriers, said plurality of first and second part carriers spaced angularly around the upper side of a table adapted to rotate about its upright axis, said apparatus comprising:
a transfer cam mounted adjacent said table; and,
a plurality of transfer mechanisms, each associated with a corresponding one of said first and second part carriers, each said transfer mechanism comprising a shaft rotatably supported between said associated first and second part carriers, a part holder connected to said shaft, and a turnover wheel connected to the outer end of said shaft having a plurality of cam followers adapted to cooperate with said transfer cam and transfer a part from said associated first part carrier to said associated second part carrier as said table rotates.

6. The apparatus of claim 5 wherein each of said transfer mechanisms is adapted to turn over said part as said part is transferred from said associated first part carrier to said associated second part carrier.

7. The apparatus of claim 6 wherein each of said shafts is mounted on the line bisecting the angle formed by the centerlines of said associated first and second part carriers.

8. The apparatus of claim 7 wherein said part holder comprises a front turnover arm having a turnover finger and a rear turnover arm having a turnover finger.

9. The apparatus of claim 8 wherein said transfer cam has a roller chain rack tooth profile.

10. An apparatus for unloading parts from a table adapted to rotate about its upright axis, said table having a plurality of first and second part carriers spaced angularly around its upper side, said apparatus comprising:
an unloading cam mounted adjacent said table;
an ejector arm disposed above the horizontal plane of said table; and,
a plurality of transfer mechanisms, each associated with a corresponding one of said first and second part carriers, each said transfer mechanism comprising a shaft rotatably supported between said associated first and second part carriers, a part holder connected to said shaft, and a turnover wheel connected to the outer end of said shaft having a plurality of cam followers adapted to cooperate with said unloading cam and raise a part off of said associated second part carrier into a generally vertical position and unload said part onto said ejector arm as said table rotates.

11. The apparatus of claim 10 further comprising a plurality of lift cams, each attached to a corresponding one of said associated first part carriers, and a cam follower connected to said ejector arm, whereby each of said lift cams cooperates with said cam follower to cause said ejector arm to pivot upwards and unload said part from said ejector arm as said table rotates.

12. The apparatus of claim 11 wherein said ejector arm includes picker rods to engage said part.

13. An apparatus for handling parts comprising:
a table disposed in a generally horizontal plane.
a plurality of first and second part carriers spaced angularly around the upper side of said table;
means for continuously rotating said table about its upright axis;
a first turnover cam mounted adjacent said table and a second turnover cam mounted adjacent said table;
a plurality of transfer mechanisms, each associated with a corresponding one of said first and second part carriers, said transfer mechanisms each comprising a shaft rotatably supported between said associated first and second part carriers, a part holder adapted to pick up and release a part connected to said shaft, and a turnover wheel having a plurality of cam followers connected to the outer end of said shaft, whereby said cam followers of said turnover wheel engage said first turnover cam as said table rotates thereby causing said part holder to engage said part and whereby said cam followers of said turnover wheel engage said second turnover cam as said table rotates thereby causing said part to be turned over and transferred from said associated first part carrier to said associated second part carrier.

14. The apparatus of claim 13 further comprising a loading cam mounted adjacent said table, a feed mechanism disposed above the horizontal plane of said table and a plurality of loading mechanisms, each associated with a corresponding one of said first part carriers, said loading mechanisms each comprising a loading tray adapted to cooperate with said loading cam such that said loading tray is raised into a generally vertical position to pick up said part and is then lowered with said part onto said associated first part carrier as said table rotates whereby said part is then oriented in a generally horizontal plane on said associated first part carrier.

15. The apparatus of claim 14 further comprising a first stationary plow positioned adjacent said first turnover cam and a second stationary plow attached to said feed mechanism whereby said part engages said first stationary plow and is moved inwardly onto said part holder as said table rotates and whereby said part engages said second stationary plow and is moved outwardly off of said part holder as said table rotates.

16. The apparatus of claim 15 wherein said first turnover cam has a roller chain rack tooth profile and said second turnover cam has a roller chain rack tooth profile oriented upside down with respect to the roller chain rack tooth profile of said first turnover cam.

17. The apparatus of claim 16 further comprising means for unloading said part from said associated second part carrier as said table rotates, said unloading means comprising a pair of unloading cams mounted adjacent said table adapted to engage said cam followers of said turnover wheel and rotate said turnover wheel so that said part is raised off of said associated second part carrier into a generally vertical position and an ejector arm disposed above said horizontal plane of said table adapted to pick up said raised part as said table rotates.

18. An apparatus for handling parts comprising:
a table disposed in a generally horizontal plane;
a plurality of first part fixtures and second part fixtures spaced angularly around the upper side of said table, said first part fixtures alternating with said second part fixtures around said table;

means for continuously rotating said table about its upright axis;

a feed mechanism for feeding parts to said first part fixtures, said feed mechanism comprising an infeed guide and an escapement mechanism adapted to release one part at a time from said infeed guide;

a loading cam mounted adjacent said table;

a plurality of loading mechanisms, each associated with a corresponding one of said first part fixtures, adapted to pick up a part from said feed mechanism and place said part on said associated first part fixture as said table rotates, each said loading mechanism comprising a loading tray pivotally secured to the outer end of said associated first part fixture, said loading tray including a cam follower adapted to cooperate with said loading cam as said table rotates so that said loading tray is raised into a generally vertical position to pick up said part released by said escapement mechanism and is lowered with said part into a generally horizontal position on to said associated first part fixture as said table rotates;

a first turnover cam mounted adjacent said table and a first stationary plow associated with said first turnover cam mounted adjacent said table;

a second turnover cam mounted adjacent said table and a second stationary plow associated with said second turnover cam mounted to said feed mechanism;

a plurality of transfer mechanisms, each associated with a corresponding one of said first and second part fixtures, each said transfer mechanism comprising a shaft rotatably supported between said associated first and second part fixtures, a part holder connected to said shaft which is adapted to pick up and release a part, and a turnover wheel having a plurality of cam followers connected to the outer end of said shaft, said cam followers cooperating with said first turnover cam to rotate said part holder 180 degrees from said associated second part fixture to said associated first part fixture whereby said first stationary plow pushes said part resting on said first part fixture inward and into engagement with said part holder as said table rotates, said cam followers then cooperating with said second turnover cam to rotate said part holder with said part 180 degrees from said associated first part fixture to said associated second part fixture whereby said second stationary plow pushes said part resting on said second part carrier outward to release said part from said part holder; and, an unloading mechanism mounted adjacent said table comprising first and second unloading cams, an ejector arm adapted to pick up a part pivotally mounted adjacent said table and a cam follower connected to said ejector arm, said first unloading cam cooperating with said cam followers of each of said turnover wheels to rotate said part holder and said part 90 degrees from said associated second part carrier into a generally vertical position and said first and second unloading cams then cooperating in unison with said cam followers of said turnover wheel to retain said part holder and said part in said vertical position as said table rotates whereby said part is then engaged and picked up by said ejector arm and said ejector arm is then pivoted upward as a lift cam mounted to said associated first part fixture cooperates with said cam follower of said ejector arm thereby causing said part to be unloaded as said table rotates.

19. The apparatus of claim 18 wherein said escapement mechanism includes a swing plate rotable through a small angle and a cam follower mounted to the bottom of said swing plate and wherein each of said first part fixtures includes an escapement cam which cooperates with said cam follower to move said swing plate thereby releasing a part from said infeed guide.

* * * * *